(12) United States Patent
Mannami

(10) Patent No.: US 8,359,064 B2
(45) Date of Patent: Jan. 22, 2013

(54) WIRELESS APPARATUS

(75) Inventor: Kazuki Mannami, Machida (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 667 days.

(21) Appl. No.: 12/665,043

(22) PCT Filed: Jun. 24, 2008

(86) PCT No.: PCT/JP2008/061435
§ 371 (c)(1), (2), (4) Date: Dec. 17, 2009

(87) PCT Pub. No.: WO2009/001809
PCT Pub. Date: Dec. 31, 2008

(65) Prior Publication Data
US 2010/0184387 A1    Jul. 22, 2010

(30) Foreign Application Priority Data
Jun. 25, 2007  (JP) .................................. 2007-166557

(51) Int. Cl.
*H04M 1/00* (2006.01)
(52) U.S. Cl. ................. 455/552.1; 455/41.2; 455/553.1; 455/67.11; 455/68; 455/69; 455/436; 455/437; 455/435.1; 455/435.2
(58) Field of Classification Search ................. 455/41.2, 455/552.1, 553.1, 67.11, 67.15, 68, 69, 436, 455/437, 440, 435.1, 435.2
See application file for complete search history.

(56) References Cited

U.S. PATENT DOCUMENTS

| | | | | |
|---|---|---|---|---|
| 5,598,401 | A | * | 1/1997 | Blackwell et al. ............ 370/385 |
| 6,058,316 | A | * | 5/2000 | Takahashi ................... 455/552.1 |
| 6,061,337 | A | * | 5/2000 | Light et al. ..................... 370/331 |
| 6,567,653 | B1 | | 5/2003 | Sanders |
| 7,184,794 | B2 | * | 2/2007 | Hess et al. ..................... 455/559 |
| 7,403,776 | B2 | * | 7/2008 | Suetaka et al. ............. 455/432.3 |
| 8,063,997 | B2 | * | 11/2011 | Lindstrom et al. ............ 348/731 |

FOREIGN PATENT DOCUMENTS

| | | |
|---|---|---|
| EP | 1 275 205 | 11/2003 |
| JP | 2000-216698 | 8/2000 |
| JP | 2004-526337 | 8/2004 |
| JP | 2007-028670 | 2/2007 |
| WO | 01/80436 | 10/2001 |

OTHER PUBLICATIONS

International Search Report for PCT/JP2008/061435 dated Jul. 22, 2008. Notification of Transmittal of Translation of the International Preliminary Report on Patentability (Application No. PCT/JP2008/061435) dated Feb. 11, 2010.

\* cited by examiner

*Primary Examiner* — Tuan A Tran
(74) *Attorney, Agent, or Firm* — Eric J. Robinson; Robinson Intellectual Property Law Offices, P.C.

(57) ABSTRACT

This invention is directed to a wireless apparatus to carry out transmission and reception by either a digital communication system or an analog communication system and, in particular, provides a technical method to change over a signal system for a transmission electric wave. Concretely, when a carrier is received, a switch (PTT) is pushed in the case of response. In this case, if a default set transmission signal system is different from a reception signal system of a received audio signal, it is possible to modulate the audio signal after the transmission signal system is changed over to the same signal system as the reception signal system. Thus, a wireless apparatus is provided for making it possible to promptly change over a signal system of a transmission electric wave without doing troublesome operations.

8 Claims, 5 Drawing Sheets

WIRELESS APPARATUS

TECHNICAL FIELD

The present invention relates to a wireless apparatus, and, more particularly, provides a wireless apparatus which can easily change over a signal system of a transmission electric wave.

BACKGROUND ART

Currently, wireless apparatuses are widely used mainly for business use in various scenes, such as, event preparation, security operations, and construction sites. In case of using wireless apparatuses for business use, approximately one to two hundreds wireless apparatuses are sometimes used in one scene. The use of wireless apparatuses in such a scene has a great advantage of allowing concurrent communication with a plurality of people. In addition, wireless apparatuses are characterized by ease of user operations for carrying out transmission and reception, resulting in prompt communication.

Wireless apparatuses communicate with each other by modulating a signal mainly according to a modulation system referred to as an analog modulation or a digital modulation, and then carrying out transmission and reception of an electric wave.

An analog modulation includes a Frequency Modulation (FM) system. By the FM system, the frequency of a carrier, an electric wave to be modulated, is changed to transmit the electric wave. Wireless communication by the FM system is used in, for example, FM radio broadcasting, amateur radio, and business radio.

A digital modulation includes a Frequency Shift Keying (FSK) system. By the FSK system, an electric wave is transmitted with the frequency of a carrier being set low when the digital data to be transmitted is zero, and being set high when the data is one. In this way, by the FSK system, two types of digital data are tailored to respective frequencies to transmit information. The FSK system includes a 4-FSK system which modulates four digital data, 00, 01, 10, and 11, into respective different frequencies. The 4-FSK system is widely used.

As described above, the modulation system used for communication depends on the type, the model, or the like of a wireless apparatus, and may not be the same. Generally, an old-modeled wireless apparatus often uses an analog modulation system, and a new-modeled wireless apparatus often uses a digital modulation system. In this case, the old-modeled and the new-modeled apparatuses cannot communicate with each other. For this reason, to a group having one hundred old-modeled wireless apparatuses, for example, ten new-modeled wireless apparatuses cannot be introduced. When a new-modeled wireless apparatus is introduced, all of the old-modeled wireless apparatuses are required to replace with new-modeled wireless apparatuses at once, which is not preferable in terms of cost.

To address the problem, Patent Document 1 discloses an invention of an apparatus which can reproduce a voice received even in an electric wave transmitted by either an analog modulation system or a digital modulation system. With this apparatus, even in a group having both new-modeled and old-modeled wireless apparatuses, a newly introduced new-modeled wireless apparatus can receive an electric wave transmitted by an old-modeled wireless apparatus and reproduce it.

Patent Document 1: Japanese Patent Application Laid-Open No. 2002-158725

DISCLOSURE OF THE INVENTION

Problems to be Solved by the Invention

According to the invention of Patent Document 1, however, in response to a received electric wave, a user receiving the electric wave is required to change over the signal system manually to a signal system by which the communication partner can reproduce a voice. For example, a new-modeled wireless apparatus (the invention according to Patent Document 1) receives an electric wave transmitted from an old-modeled wireless apparatus by an analog signal system, and response to this, an operation of changing over to an analog signal system is required to transmit an electric wave.

This user operation is troublesome, reducing the capability of a wireless apparatus to allow prompt communication with easy operations.

The present invention has been made to solve the problem, and the object of the present invention is to provide a wireless apparatus which can change over a signal system for a transmission electric wave without troublesome operations.

Means for Solving the Problems

A wireless apparatus according to the present invention basically comprises: communication means for carrying out transmission and reception of an electric wave by a communication system which is either a digital communication system or an analog communication system; input means for inputting a command instructing communication; selecting means for selecting either of the digital communication system or the analog communication system; and control means for outputting, to the selecting means, a command to change over to a communication means when the electric wave is received by the communication system during a basic communication mode of operation and the command instructing communication is inputted from the input means, the other of the communication systems being set to the basic communication mode of operation.

According to the present invention, preferably,
the control means counts predetermined time starting from a time point of completion of transmission and reception of the electric wave via the communication means, and outputs, to the selecting means, a command to return the communication system back to the basic communication mode of operation after lapse of the predetermined time.

Furthermore, preferably,
the control means, when carrying out transmission and reception of the electric wave via the communication means upon lapse of the predetermined time, outputs, to the selecting means, a command to maintain the communication system by which transmission and reception are being carried out, and counts the predetermined time again starting from a time point of completion of transmission and reception.

Effect of the Invention

According to the present invention, even in a group having both wireless apparatuses by an analog modulation system and wireless apparatuses by a digital modulation system, smooth communication can be carried out. New-modeled wireless apparatuses can be therefore introduced for a part of the group. Hence, utilization of new-modeled wireless apparatuses can be facilitated at low cost.

Figure 1:
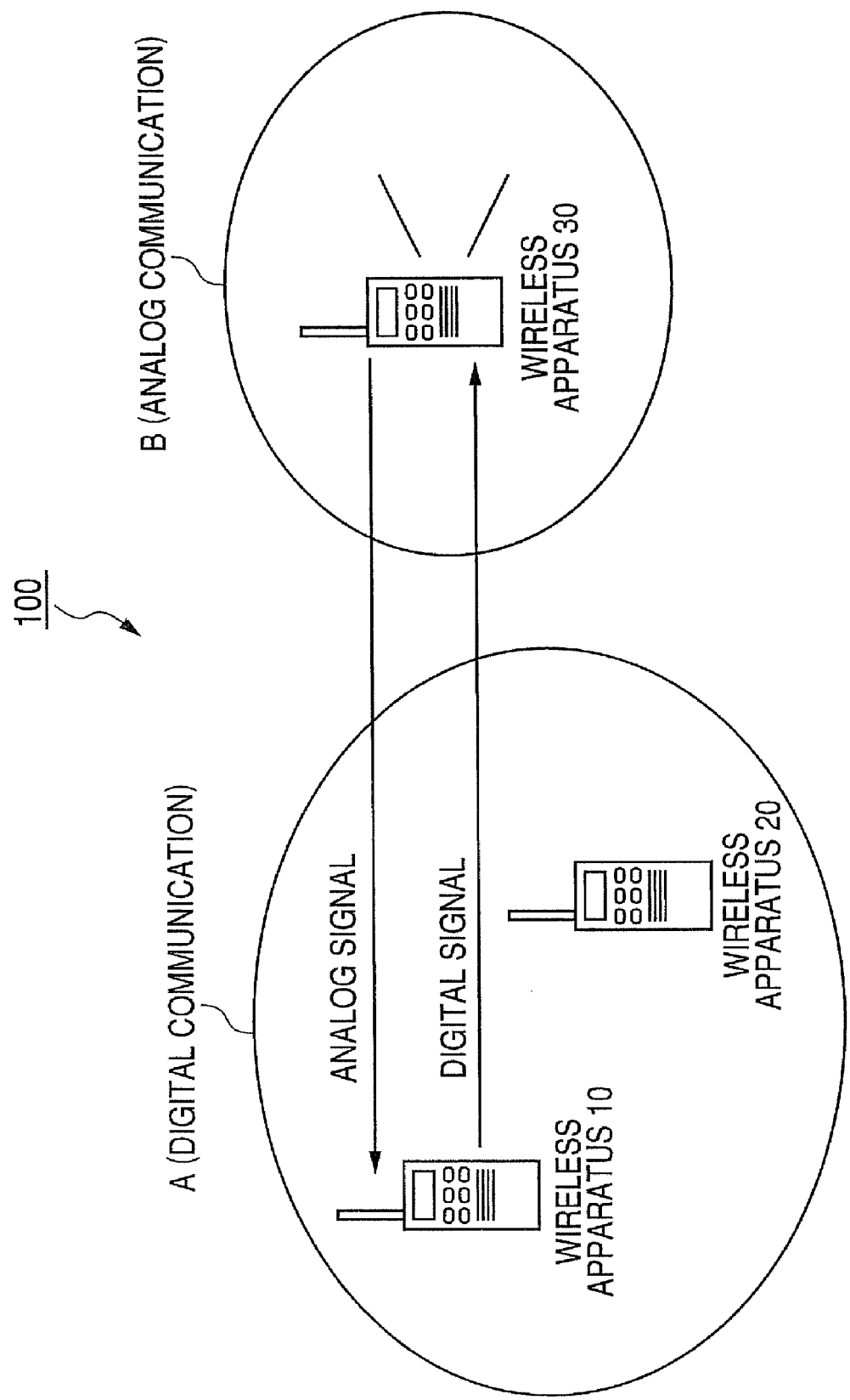
FIG. 1 is an overall view of a configuration illustrating an example of a wireless communication system.

DESCRIPTION OF SYMBOLS 100 wireless communication system
10, 20, 30 wireless apparatus
1 communication unit
2 control unit
3 memory unit
4 input unit
5 talking unit

BEST MODES FOR CARRYING OUT THE INVENTION

A configuration and operation of the most preferable embodiment of a wireless apparatus according to the present invention will be described below in detail with reference to the drawings.

FIG. 1 is an overall view of a wireless communication system 100 of the embodiment.

The wireless communication system 100 includes a wireless apparatus 10, a wireless apparatus 20, and a wireless apparatus 30. The wireless apparatus 10 and the wireless apparatus 20 belong to the same group A. The wireless apparatus 30 belongs to another group B. A group here is formed based on a signal system for communication. The apparatuses communicate with each other in the same group, by a digital signal system in the group A and by an analog signal system in the group B.

Figure 2:
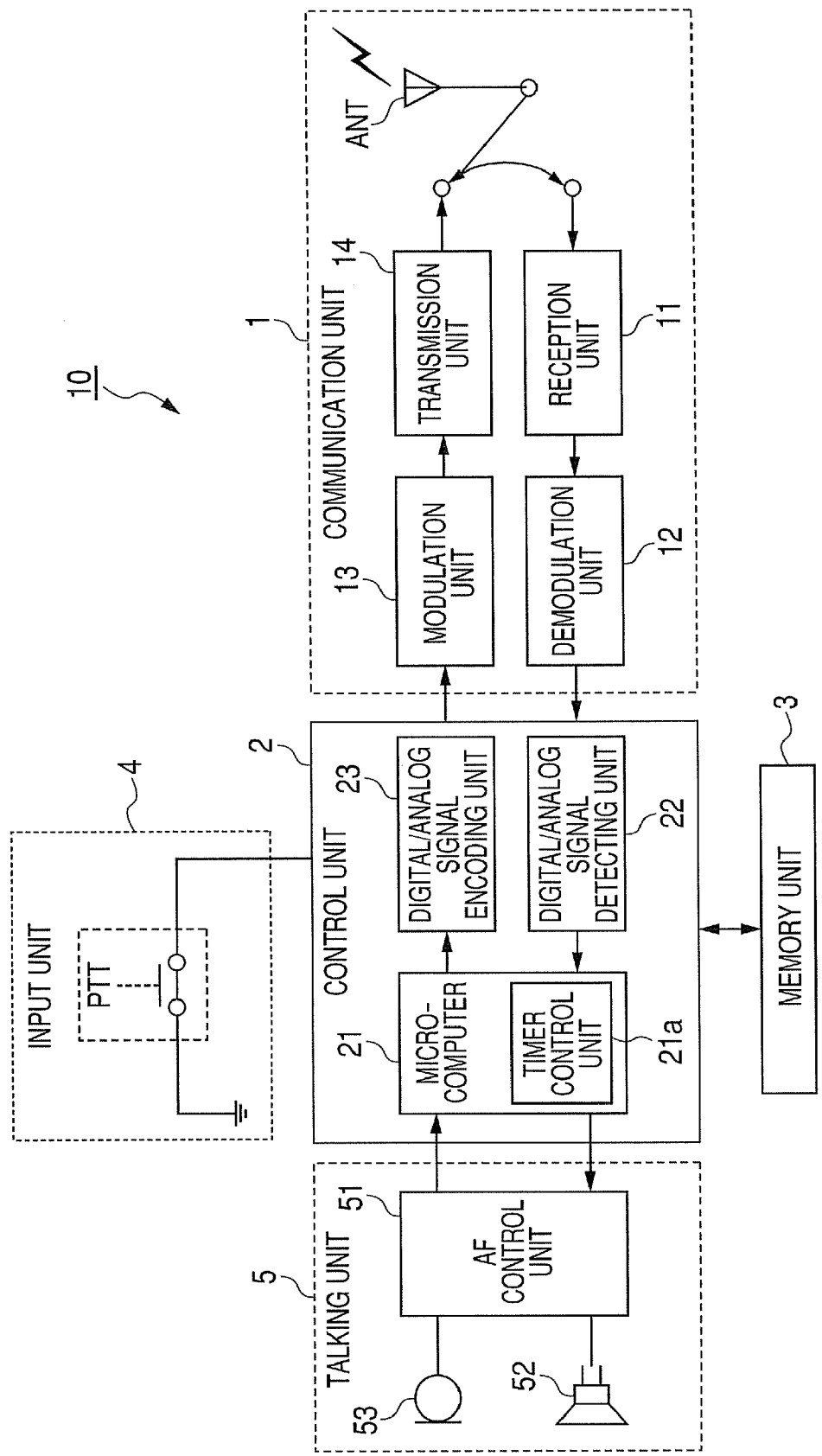
FIG. 2 is a functional block diagram of a wireless apparatus.

FIG. 2 is a functional block diagram of the wireless apparatus 10.

The wireless apparatus 10 includes a communication unit 1, a control unit 2, a memory unit 3, an input unit 4, and a talking unit 5.

The communication unit 1 includes a reception unit 11, a demodulation unit 12, a modulation unit 13, a transmission unit 14, and an antenna ANT. The communication unit 1 receives, via the antenna ANT, a carrier (wave) transmitted from the wireless apparatus or the wireless apparatus 30 in a predetermined frequency band. After receiving the carrier, the reception unit 11 and the demodulation unit 12 adjust, detect, and amplify the carrier, and output it to the control unit 2.

The modulation unit 13 and the transmission unit 14 modulate the frequency of the signal outputted from the control unit 2 into a predetermined frequency, amplify the modulated signal, and transmit the carrier via the antenna ANT to the wireless apparatus 20 or the wireless apparatus 30.

The control unit 2 includes a microcomputer 21, a digital/analog (D/A) signal detecting unit 22, and a digital/analog (D/A) signal encoding unit 23. The microcomputer 21 is provided with a timer control unit 21a.

The microcomputer 21 totally controls the D/A signal detecting unit 22 and the D/A signal encoding unit 23 based on various control programs and setting data stored in the memory unit 3. The timer control unit 21a measures predetermined time starting from a time point of completion of communication with the wireless apparatus 20 or the wireless apparatus 30 via the communication unit 1. After the predetermined time lapses, the timer control unit 21a outputs, to the microcomputer 21, a command to change over to a basic communication mode of operation. The basic communication mode of operation and the predetermined time are determined based on setting values, data, and the like stored in the memory unit 3.

The D/A signal detecting unit 22 detects an audio signal system of a signal outputted from the communication unit 1. The detected audio signal system is either an analog signal system or a digital signal system.

The D/A signal encoding unit 23 determines an audio signal system for transmission under control of the microcomputer 21. The D/A signal encoding unit 23 then outputs, to the modulation unit 13, an audio signal to be transmitted to the wireless apparatus 20 or the wireless apparatus 30 as well as an instruction for modulation by the determined signal system.

The memory unit 3 includes a nonvolatile memory (not shown). The nonvolatile memory stores various control programs which the control unit 2 executes, setting data, and the like.

The input unit 4 includes a power switch, a frequency selector switch, a frequency adjustment knob, and a volume dial (now shown). The input unit 4 is provided with a Push To Talk (PTT). The PTT is a button to be pushed when responding to the wireless apparatus 20 or the wireless apparatus 30. The PTT also functions as a button to change over the signal system for an audio signal to be transmitted. An example of the PTT being pushed is as follows. After the wireless apparatus 10 receives a carrier transmitted from the wireless apparatus 20 or the wireless apparatus 30, a user pushes the PTT for response to the call. The user then inputs an audio signal via a microphone 53 with the PTT being pushed. A control process of the control unit 2 when the PTT is pushed will be described below with reference to FIG. 4.

The talking unit 5 includes an Audio Frequency (AF) control unit 51, a speaker 52, and the microphone 53. The AF control unit 51 controls the audio signal outputted from the control unit 2 to output it via the speaker 52. In particular, the AF control unit 51 controls voice volume, quality and the like of the speaker 52. The AF control unit 51 also obtains a voice inputted from the microphone 53, and outputs it to the control unit 2.

The components with which the wireless apparatus 10 is provided have been described. The configurations of the wireless apparatus 20 and the wireless apparatus 30 are the same as with the wireless apparatus 10 and will not be described.

Now, a communication process of the wireless apparatus 10 will be described with reference to FIGS. 3 to 5.

Figure 3:
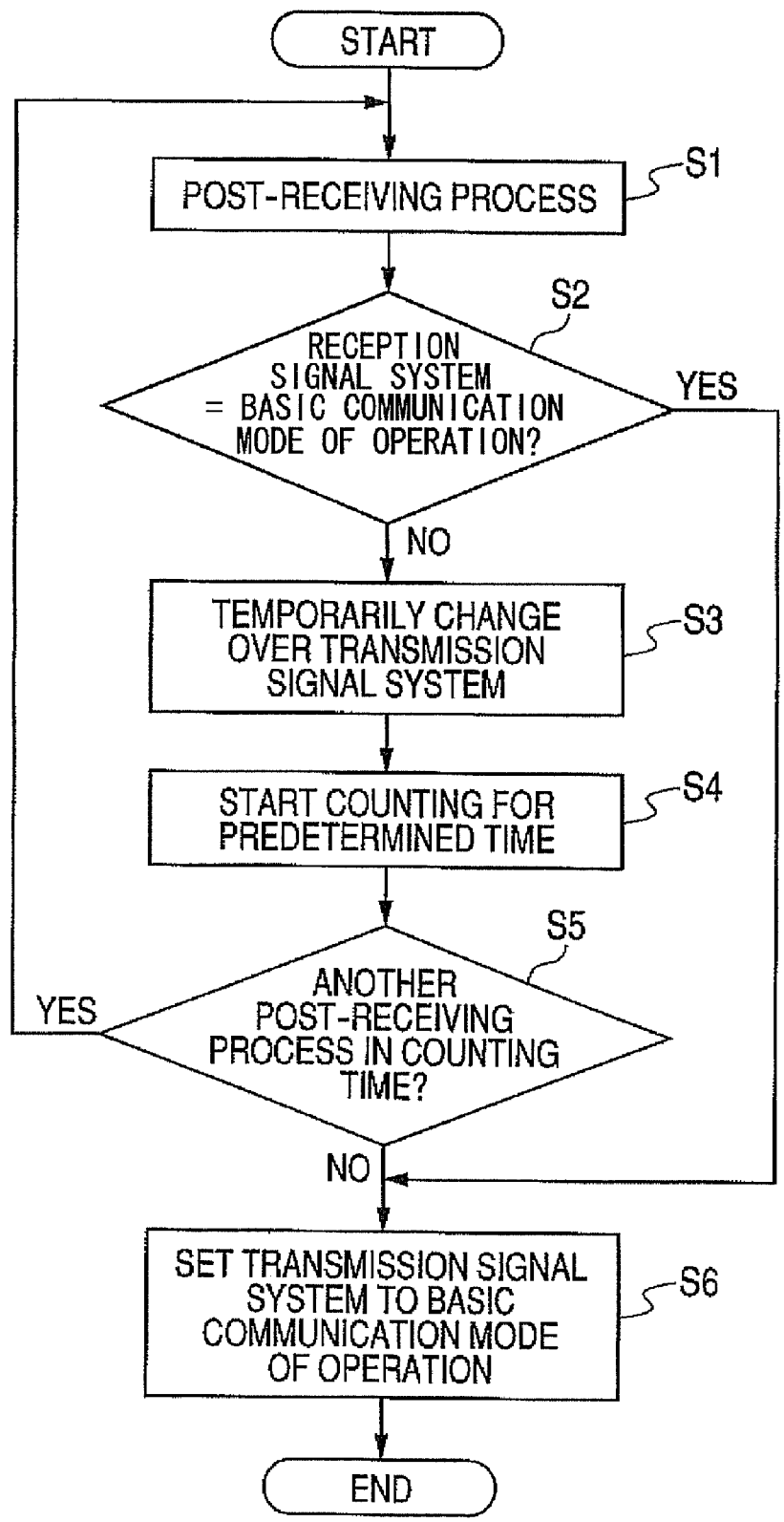
FIG. 3 is a flowchart illustrating operations of a post-receiving process.
Figure 4:
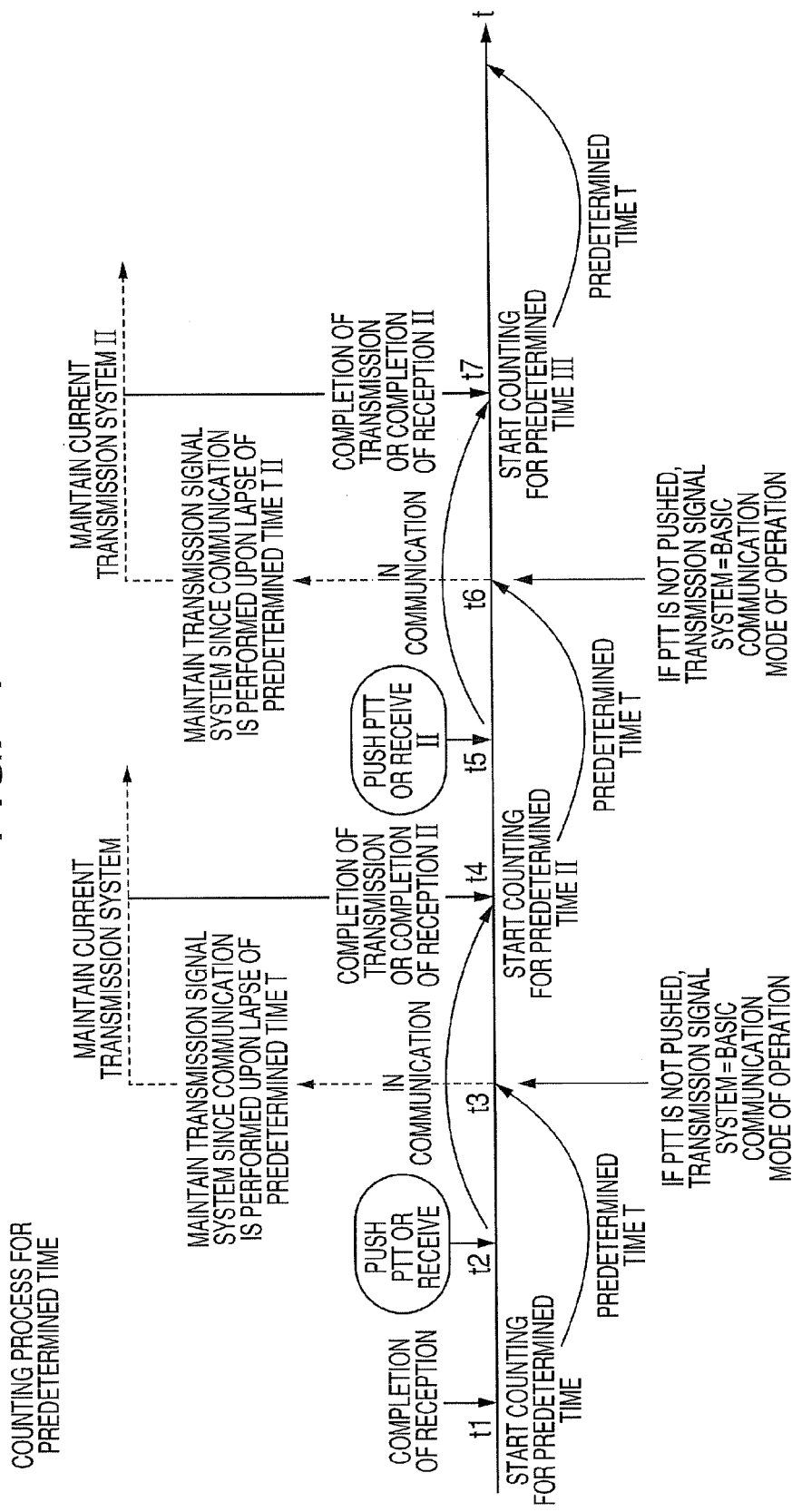
FIG. 4 illustrates a counting process for a predetermined time.

FIG. 3 illustrates a post-receiving process when the wireless apparatus 10 receives a carrier.

The control unit 2 receives a carrier transmitted from the wireless apparatus 20 or the wireless apparatus 30 via the antenna ANT, and performs the post-receiving process for the carrier (Step S1).

The post-receiving process has mainly: a signal-processing process for adjusting, demodulating, and amplifying the received signal; and a detecting process for detecting the signal system of the signal-processed audio signal.

The signal-processing process is performed by the reception unit 11 and the demodulation unit 12. The reception unit 11 and the demodulation unit 12 output, to the control unit 2, the signal-processed audio signal extracted from the carrier.

The detecting process is performed by the control unit 2. The control unit 2 detects whether the signal system type of the signal-processed audio signal is a digital system or an analog system. The signal system type can be detected by the difference of an analog waveform (for example, when it is the FM system) and a digital waveform (for example, when it is the FSK system).

After detecting whether the reception signal system is a digital one or an analog one, the control unit 2 determines whether the detected signal system is the same as the basic communication mode of operation (Step S2). The basic communication mode of operation is the type of a transmission signal system previously stored in the memory unit 3 as a default set. The default set may be optionally changed by the user via the input unit 4.

If the control unit 2 determines that the reception signal system is the same as the basic communication mode of operation (Step S2; YES), the basic communication mode of operation is kept as the transmission signal system (Step S6), and the post-receiving process ends.

If the control unit 2 determines that the reception signal system is not the same as the basic communication mode of operation (Step S2; NO), the transmission signal system is temporarily changed over to the detected signal system (Step S3). For example, when the reception signal system is an analog signal system and the basic communication mode of operation is set to a digital signal system, the transmission signal system is changed over to the analog signal system.

In this embodiment, the transmission signal system is temporarily changed over at Step S3. Alternatively, in a transmission process described below, the system may be changed over when the PTT is pushed (See FIG. 5; Step S11).

The control unit 2, after changing over the transmission signal system, starts counting for the predetermined time (Step S4). The counting starts at the time point of completion of the post-receiving process. The predetermined time is a set value previously stored in the memory unit 3. In particular, when the D/A signal detecting unit 22 detects the reception signal system, and the microcomputer 21 temporarily changes over the transmission signal system, the timer control unit 21*a* in the microcomputer 21 starts the counting for the predetermined time.

During the counting for the predetermined time by the control unit 2, when another post-receiving process starts via the communication unit 1 (Step S5; YES), the control unit 2 returns the process back to Step S1. In this case, another counting for the predetermined time starts at Step S4 after the process described above is performed.

During the counting for the predetermined time by the control unit 2, when no post-receiving process starts (Step S5; NO), the transmission signal system temporarily changed over at Step S3 is returned back to the basic communication mode of operation (Step S6), and the post-receiving process ends.

Now, with reference to FIG. 4, a counting process will be described which the timer control unit 21*a* in the control unit 2 performs for counting the predetermined time. A horizontal axis (t) represents lapse time. As basic operations, the timer control unit 21*a* starts counting for the predetermined time upon completion of transmission and reception of the carrier, and outputs, to the microcomputer 21, an instruction to change over the transmission signal system after the predetermined time lapses. The microcomputer 21 receives the instruction from the timer control unit 21*a*, and sets the transmission signal system to the basic communication mode of operation.

Upon completion of transmission and reception, the timer control unit 21*a* starts counting for the predetermined time T (t1). When the PTT is not pushed or no other carrier is received in the predetermined time, the transmission signal system is returned back to the basic communication mode of operation upon lapse of the predetermined time (t3).

When the PTT is pushed or another carrier is received in the predetermined time T (t2), the microcomputer 21 does not change over the transmission signal system and the current transmission signal system is maintained even after the predetermined time has lapsed during communication (t3).

Upon completion of communication with another wireless apparatus (t4), the timer control unit 21*a* starts another counting for the predetermined time from this time point. After that, at the time points t5 to t8, the timer control unit 21*a* repeats the counting for the predetermined time, and the microcomputer 21 repeats the changing-over operation of the transmission signal system.

Figure 5:
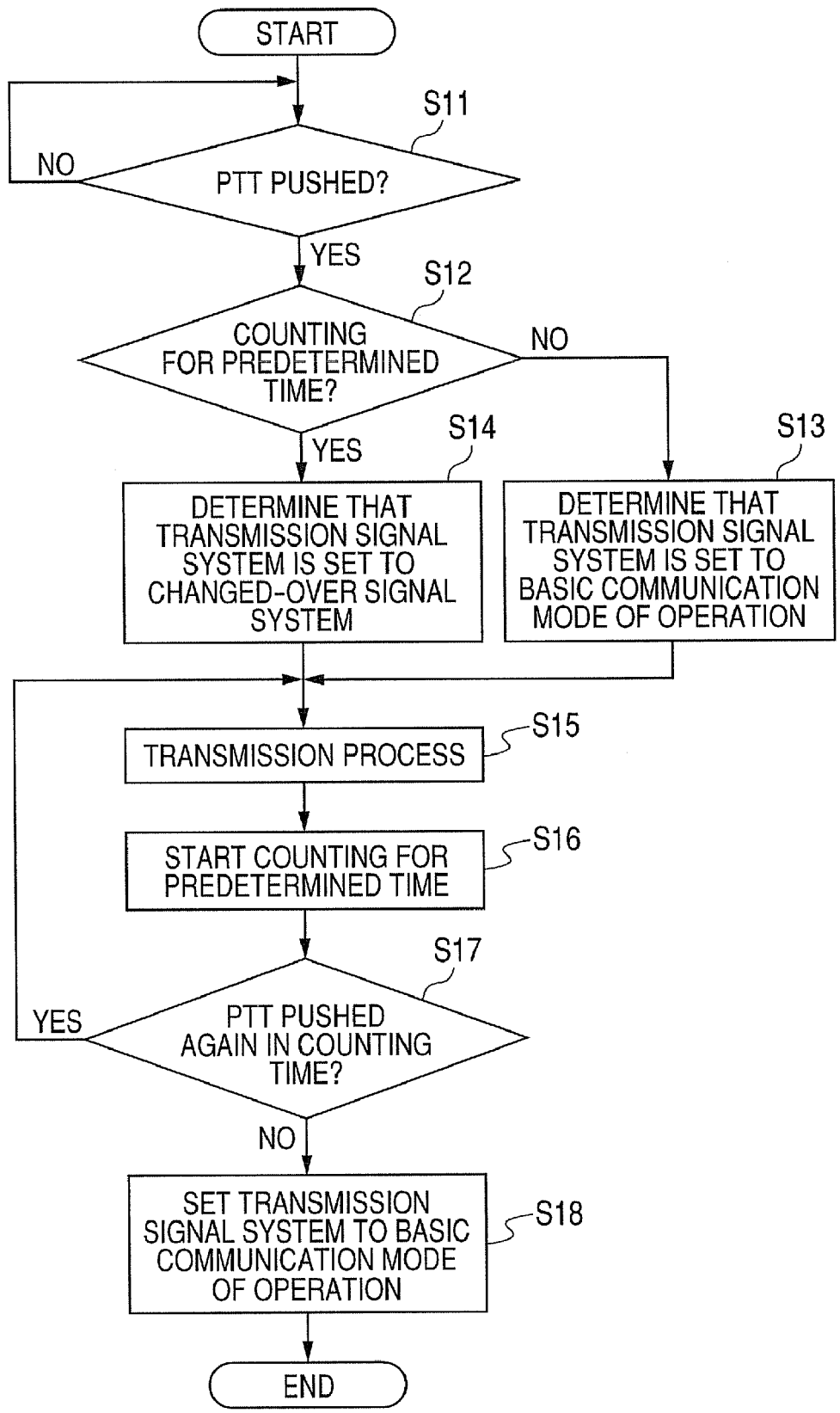
FIG. 5 is a flowchart illustrating operations of a transmitting process.

FIG. 5 illustrates the transmission process when the wireless apparatus 10 transmits the carrier.

As described with respect to FIG. 3, when receiving the carrier from the wireless apparatus 20 or the wireless apparatus 30, the wireless apparatus 10 performs the post-receiving process. When the user pushes the PTT in response to this, the wireless apparatus 10 performs the transmission process for transmitting an audio signal to the wireless apparatus or the wireless apparatus 30. The transmission process will be described below.

The control unit 2 waits until the PTT is pushed and the control unit 2 receives a command instructing transmission (Step S11). When the PTT is pushed and the control unit 2 receives a transmission instruction via the input unit 4, the control unit 2 performs the transmission process (Step S11; YES).

The control unit 2 determines whether the timer control unit 21*a* is counting or not (Step S12). The fact that the timer control unit 21*a* is counting means that the predetermined time has not lapsed after completion of the post-receiving process.

If the control unit 2 determines that the timer control unit 21*a* is not counting (Step S12; NO), the control unit 2 determines that the transmission signal system is set to the default setting basic communication mode of operation (Step S13). The control unit 2 then performs the transmission process in the determined basic communication mode of operation (Step S15).

If the control unit 2 determines that the timer control unit 21*a* is counting (Step S12; YES), that is, if the reception signal system is different from the basic communication mode of operation, the control unit 2 determines that the transmission signal system is set to the signal system temporarily changed over at Step S3 (Step S14).

An example of this case is when the wireless apparatus 10 transmits a carrier to the wireless apparatus 30. In the group A, a digital signal system is used to carry out transmission and reception of the carrier. A digital signal system is therefore set as the basic communication mode of operation of the transmission signal system in the wireless apparatus 10. A signal which the wireless apparatus 10 receives from the wireless apparatus 30 is in an analog signal system. A signal which the wireless apparatus 10 transmits to the wireless apparatus 30 is in a digital signal system. In this case, the wireless apparatus 10 determines that the transmission signal system is changed over to an analog signal system.

The control unit 2 performs the transmission process by the determined transmission signal system (Step S15). The control unit 2 then starts second counting for the predetermined time (Step S16) instead of the first counting for the predetermined time at Step S12. The second counting for the predetermined time by the control unit 2 results in the transmission signal system being maintained which is determined at Step S13 or S14.

When the PTT is again pushed in the predetermined time for the second counting (Step S17; YES), the control unit 2 returns the process back to Step S15, and performs the transmission process (Step S15). The transmission signal system for this transmission process is the transmission signal system determined at Step S13 or S14. This transmission signal system is maintained until the control unit 2 starts third counting for the predetermined time.

When the PTT is not pushed in the predetermined time for the second counting and the predetermined time has lapsed (Step S17; NO), the control unit 2 returns the transmission signal system changed over at Step S14 back to the basic communication mode of operation (Step S18), and the transmission process ends.

As described above, according to the embodiment, when receiving a carrier from another wireless apparatus, the user only needs to respond to it by pushing the PTT. By pushing the PTT, the transmission signal system may be automatically changed over to the same signal system as the reception signal system to transmit the carrier. Thereby, the user is not required to change over the signal system in addition to response operations to the call, therefore allowing prompt communication.

The signal system for communication is generally either a digital system or an analog system. That is, generally, the groups A does not so often communicate with the group B. From this fact, if a digital signal system is changed over to an analog signal system for transmission, it is desirable that the transmission signal system changed over is automatically returned back to the default set basic communication mode of operation after the predetermined time has lapsed. According to the embodiment, it is made possible. Therefore, a user is not required troublesome operations of manually changing over the transmission signal system many times, thus increasing usability.

In addition, in communication between different systems, a digital signal system and an analog signal system, the control for changing over the transmission signal system each time a carrier is transmitted makes the transmission process troublesome, hence reducing the performance. It is therefore preferable that the changed-over transmission signal system is maintained until communication sequence ends. According to the embodiment, it is made possible. Thereby, the reduction in performance can be avoided.

The invention claimed is:

1. A wireless apparatus, comprising:
   an input unit configured to input a command instructing communication;
   a communication unit configured to transmit and receiving an electric wave by either a first communication system or a second communication system, the first communication system being a predetermined one communication system of a digital communication system and an analog communication system, and the second communication system being the other communication system;
   a memory unit configured to store the first communication system as a transmission signal system to be transmitted by the communication unit when the command instructing communication is inputted;
   a judgment unit configured to judge whether or not the received electric wave is of the first communication system; and
   a change unit configured to temporarily change the transmission signal system to the second communication system if the received electric wave is not of the first communication system.

2. The wireless apparatus according to claim 1, the apparatus further comprising:
   a count unit configured to count a predetermined term after the change by the change unit is made; and
   a control unit configured to set the second communication system as a transmission signal system during the predetermined term and to set the first communication system as the transmission signal system when the predetermined term expires.

3. The wireless apparatus according to claim 1, the apparatus further comprising:
   a count unit configured to count a predetermined term on the basis of the reception completion of an electric wave not being of the first communication system; and
   a control unit configured to set the second communication system as a transmission signal system during the predetermined term and to set the first communication system as the transmission signal system when the predetermined term expires.

4. The wireless apparatus according to claim 1, the apparatus further comprising:
   a second judgment unit configured to judge whether or not the communication unit has transmitted an electric wave by the second communication system;
   a count unit configured to count a predetermined term on the basis of time points at which the transmission has been completed, if the communication unit has transmitted the electric wave by the second communication system; and
   a control unit configured to set the second communication system as a transmission signal system during the predetermined term and to set the first communication system as the transmission signal when the predetermined term expires.

5. A wireless communication method, comprising the steps of:
   receiving an electric wave by either a first communication system or a second communication system, the first communication system being a predetermined one communication system of a digital communication system and an analog communication system, and the second communication system being the other communication system;
   storing the first communication system as a transmission signal system to be transmitted when the command instructing communication is inputted;
   judging whether or not the received electric wave is of the first communication system; and
   temporarily changing the transmission signal system to the second communication system if the received electric wave is not of the first communication system.

6. The wireless communication method according to claim 5, the method further comprising the steps of:
   counting a predetermined term after the change is made in the changing step; and
   setting the second communication system as a transmission signal system during the predetermined term and setting the first communication system as the transmission signal system when the predetermined term expires.

7. The wireless communication method according to claim 5, the method further comprising the steps of:
    counting a predetermined term on the basis of time points at which the reception of an electric wave not being of the first communication system has been completed; and
    setting the second communication system as a transmission signal system during the predetermined term and setting the first communication system as the transmission signal system when the predetermined term expires.

8. The wireless communication method according to claim 5, the method further comprising the steps of:
    counting a predetermined term on the basis of time points at which a transmission has been completed if an electric wave has been transmitted by the second communication system; and
    setting the second communication system as a transmission signal system during the predetermined term and setting the first communication system as the transmission signal system when the predetermined term expires.

* * * * *